United States Patent [19]

Letournel et al.

[11] Patent Number: 5,048,402
[45] Date of Patent: Sep. 17, 1991

[54] APPARATUS FOR KNEADING AND COOKING

[75] Inventors: Gilles J. Letournel, Ouistreham; Vital A. Parise, Douvres, both of France

[73] Assignee: Moulinex (Societe Anonyme), Bagnolet, France

[21] Appl. No.: 626,882

[22] Filed: Dec. 13, 1990

[30] Foreign Application Priority Data

Dec. 13, 1989 [FR] France ................. 89 16450

[51] Int. Cl.$^5$ ............................. B01F 15/06
[52] U.S. Cl. ......................... 99/348; 99/331; 99/468; 366/146; 366/314
[58] Field of Search ............... 99/348, 331, 352, 467, 99/468, 483; 366/144-146, 149, 69, 98, 314, 205

[56] References Cited

U.S. PATENT DOCUMENTS

| | | | |
|---|---|---|---|
| 1,227,935 | 5/1917 | Robertson | 366/146 |
| 1,491,991 | 4/1924 | Lacy et al. | 366/146 |
| 1,946,840 | 2/1934 | Cox | 366/146 |
| 2,867,420 | 1/1959 | Potts | 366/145 |
| 3,176,968 | 4/1965 | Appleton | 99/348 |
| 3,220,450 | 11/1965 | Aronson, II et al. | 99/348 |
| 4,693,610 | 9/1987 | Weiss | 99/348 |
| 4,762,057 | 8/1988 | Hirota et al. | 99/468 |
| 4,802,407 | 2/1989 | Negri et al. | 366/145 |
| 4,869,164 | 9/1989 | Takeyama | 99/483 |
| 4,903,589 | 2/1990 | Aoyama | 366/98 |

FOREIGN PATENT DOCUMENTS

| | | | |
|---|---|---|---|
| 453937 | 9/1936 | United Kingdom | 99/348 |
| 2196238 | 4/1988 | United Kingdom | 366/145 |

Primary Examiner—Timothy F. Simone
Attorney, Agent, or Firm—Young & Thompson

[57] ABSTRACT

Apparatus for kneading and cooking, comprises a bowl (1) removably mounted on a base (4) enclosing a drive mechanism (5) adapted to drive in rotation a working tool (8) such as a rotating scraper. Heating elements (10, 11) are provided. The bowl is in the form of a basin (12) and an enclosure (13), the basin being within the enclosure and the two being spaced apart. The heating elements are provided in the space (E) between the basin and the enclosure and are distributed between a lateral heating element (10) and a bottom heating element (11). The heating elements are fed with electric current by disconnectable electrical connection devices (17, 18, 19) provided on the enclosure and the base.

9 Claims, 1 Drawing Sheet

APPARATUS FOR KNEADING AND COOKING

The present invention relates to apparatus for kneading and cooking foodstuffs.

The invention relates more particularly to such apparatus comprising a working bowl having a bottom and a side wall and removably mounted on a base enclosing a drive mechanism whose output shaft is adapted to couple with a drive shaft which passes through the bottom of the bowl and which is fixed in rotation with a working tool provided in said bowl, as well as heating means adapted to heat the bowl so as to permit cooking the contents.

Known apparatus is adapted principally for the preparation of sauces and creams, the heating means cooking the ingredients principally from below and the working tool being adapted to prevent the ingredients from clinging to the bottom and forming lumps. Such apparatus however have the drawback of being very limited as to their use.

The invention has for its object to overcome this disadvantage and to provide apparatus having numerous possibilities of uses while being simple, inexpensive and easy to use.

According to the invention, the bowl is formed of a double wall comprising a basin and an enclosure mounted with a small spacing from each other and the heating means are provided in the space between the basin and the enclosure and are distributed as a lateral heating element and a bottom heating element so as to heat respectively the side wall and the bottom of said basin, the heating means being fed with electric current by means of complementary and detachable electrical connection devices provided respectively on the enclosure and the base.

There is thus obtained an apparatus which is adapted for the preparation not only of sauces and creams, but also of pastries, bread, cakes, etc. Thus, this apparatus may be converted from saucemaker to deep fat fryer to oven according to the manner of heating. In this way, to prepare bread or cake, the ingredients are first kneaded by the working tool, then baking is effected by simultaneous heating of the two heating elements. To prepare sauces or creams or for browning, the tool mixes the ingredients, while cooking is effected only with the bottom heating element.

BRIEF DESCRIPTION OF THE DRAWING

The characteristics and advantages of the invention will become apparent from the following description, with reference by way of example to the accompanying drawing, in which the sole figure is a transverse cross-sectional view of apparatus according to the invention.

DESCRIPTION OF THE PREFERRED EMBODIMENTS

Figure 1:
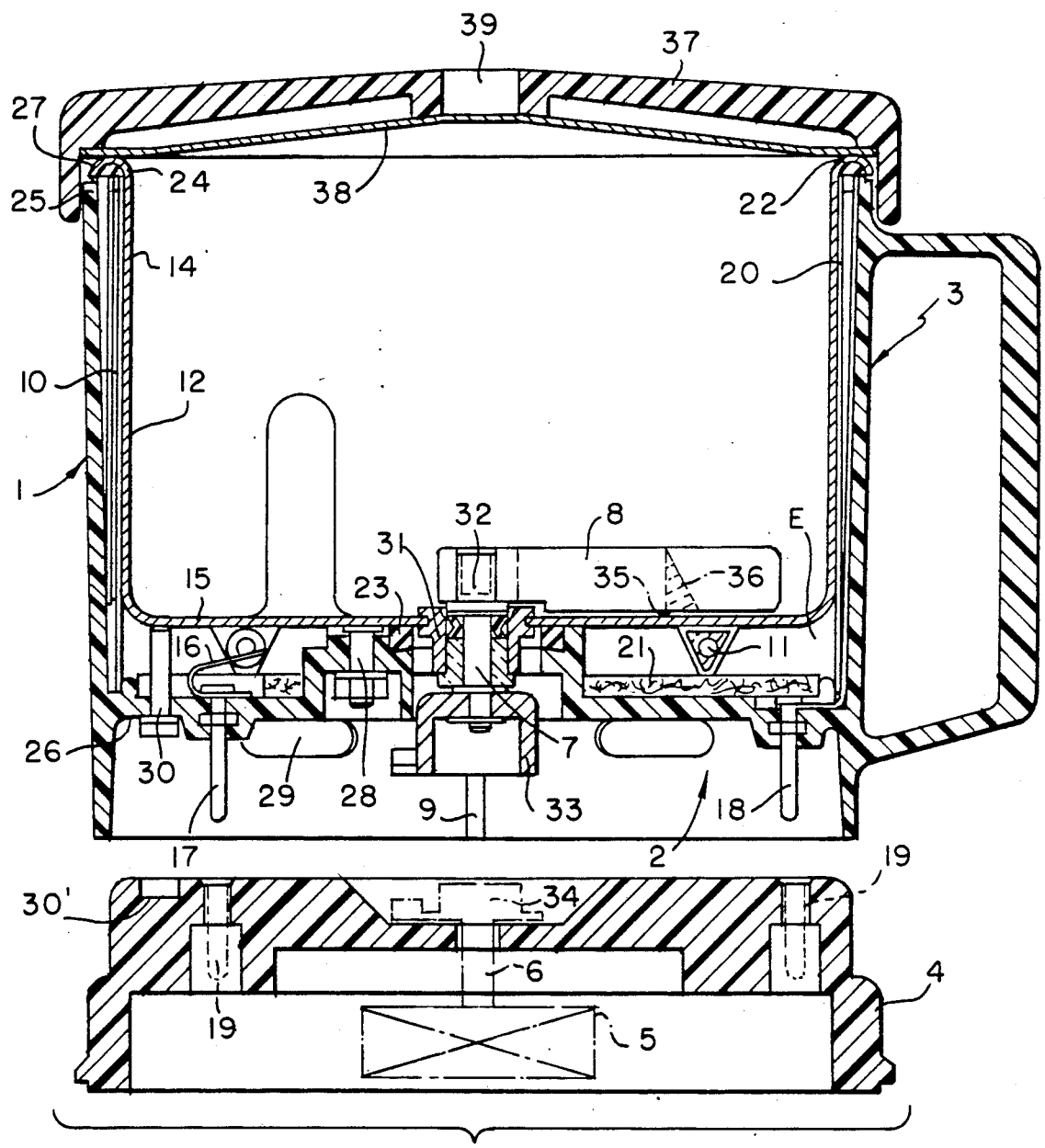

The kneading and cooking apparatus for foodstuffs shown in FIG. 1 comprises a cooking bowl 1 having a bottom 2 and a side wall 3, and removably mounted on a base 4 which encloses a drive mechanism 5 (shown in broken lines) whose output shaft 6 is adapted to couple with a drive shaft 7 which passes through bottom 2 of bowl 1 and which is fixed rotatably to a working tool 8 provided in said bowl 1.

Thanks to its removability, this bowl 1 may be used on the base 4 of a kitchen appliance comprising an appliance such as a chopper, mixer or slicer.

The bowl 1 is indexed in its rotated position by three ribs 9 which resist the torsional forces. The bowl 1 moreover comprises heating means 10, 11 adapted to heat the bowl 1 so as to permit cooking the contents.

According to the invention, the bowl 1 is comprised by a double wall having a metal basin 12 and an enclosure 13 constituted of thermally insulating molded plastic material and mounted at a small distance from each other. The heating means 10, 11 are provided in the space E remaining between the basin 1 and the enclosure 13 and are distributed between a lateral heating element 10 and a bottom heating element 11 so as to heat respectively the side wall 14 and the bottom 15 of said basin 12, the heating means 10, 11 being fed with electric current by means of two pairs of complementary and detachable electrical connection devices, namely pins 17, 18 and sockets 19, provided respectively on the enclosure 13 and the base 4.

The connection of the bottom heating element 11 with a pair of pins 17 is by contact of flexible blades 16 mounted on pins 17. The lateral heating element 10 is directly connected to the pair of sockets 19.

The lateral heating element 10 surrounds said basin 12 and extends over substantially all the height of said lateral wall 14. It is constituted by a resistive wire wound about an insulating support 20, for example of samicanite, surrounding the basin 12. The power of the lateral heating element 10 is constant and is between 120 and 160 watts.

The bottom heating element 11 is constituted by an armored heating element secured to the bottom 15 of the basin and separated from enclosure 13 by an insulating material 21 of the type of glass fiber cloth. The power of the bottom heating element 11 is variable from 0 to 400 watts. The relationship of the power of the lateral heating element 10 to the maximum power of the bottom heating element 11 is therefore between 0.3 and 0.4.

Space E between the basin 12 and the enclosure 13 is sealed by sealing means 22, 23 of the type of silicone joints interposed on the one hand between the upper edges 24, 25 of the basin 12 and the enclosure 13 and, on the other hand, between the respective bottom walls 15, 26 of the basin 12 and the enclosure 13.

The basin 12 and the enclosure 13 are cylindrical and the upper edge 24 of said basin 12 has a flange 27 in the form of a throat which covers the edge 25 of enclosure 13 and which contains the joint 22.

The bottom 15 of the basin 12 comprises means 28 for securing it with the enclosure 13, constituted by four screw-threaded posts 28 welded to basin 12, so as to constitute with the sealing means 22, 23 a completely sealed bowl 1. Thus sealed, the bowl 1 can be washed with water. Openings 29 provided below the bottom 2 of the bowl permit either water to flow out after washing, or during cooking to ventilate the bottom 2 of bowl 1. The bowl exposes on bottom 26 of the enclosure only the said electrical connection devices 17, 18, a temperature recording stud 30 and the end of drive shaft 7. Drive shaft 7 is sealingly mounted in a bearing 31 integral with the bottom 15 of the basin, of which one end is connected to a hub 32 of the working tool 8 and whose other end is provided with a detachable coupling device 33 adapted to come into engagement with the driver 34 (shown in broken lines) secured to the output shaft of the drive mechanism 5.

The working tool 5 comprises a scraper which has the shape of a bar of triangular vertical cross section having a base 35 substantially parallel to bottom 15 of basin 12 and an inclined so-called attack surface 36 inclined upwardly in the direction of rotation. The tool can turn at about 300 rpm. The tool 8, resting on the bottom 15 of basin 12 during cooking, is preferably clad with an anti-stick material which permits easy emptying of the preparation.

The bowl 1 is provided with a cover 37 of a thermally insulating material comprising a metallic reflector 28 directed toward the interior of basin 12, and has a central opening 39 for the escape of steam during cooking. Reflector 38, heated by basin 12 by conduction, reflectively radiantly heats the top of the preparation and avoids condensation of steam and thus streams of water during preparation. Thanks to cover 37, a true oven is obtained.

The apparatus also comprises a programmable control device (not shown) connected to a rotative speed regulator of the tool 8 and to a power regulator for the heating elements 10, 11 so as to provide, either an automatic heating cycle in which the speed of rotation and the power of the heating elements 10, 11 are set as a function of the type of preparation, or a manual cooking cycle in which the user chooses a speed of rotation and a power for the bottom heating element 11, the power of the lateral heating element 10 remaining zero.

For the sake of clarity, the different manners of use of the apparatus will be explained.

To use the apparatus as a saucemaker or for sauteing (manual cooking cycle), the user adjusts the power of the armored resistance 11, the temperature being electronically regulated by means of a thermostatic detector 30' which is connected to the stud 30. The user also adjusts the speed of rotation of the tool 8.

To use the apparatus as an oven (automatic cooking cycle), the speed of rotation of the tool 8 and the power of the heating elements 10, 11 are pre-programmed (either by the user, or by the manufacturer). The user adds the ingredients to the bowl and closes the cover 37. The ingredients are then kneaded and then cooked, according to the time, the speed of rotation and the temperature determined by the program cycles. Thus the user makes use of a single accessory to perform two operations: kneading and cooking. At the end of cooking, the user empties out the preparation.

What is claimed is:

1. Apparatus for kneading and cooking foodstuffs comprising a working bowl (1) having a bottom (2) and a side wall (3), and mounted removably on a base (4) enclosing a drive mechanism (5) whose output shaft (6) is adapted to couple with a drive shaft (7) which passes through the bottom (2) of the bowl (1) and which is secured for rotation to a working tool (8) provided in said bowl (1), as well as heating means (10, 11) adapted to heat the bowl (1) so as to permit cooking the contents, wherein the bowl (1) is comprised by a double wall comprising a basin (12) and an enclosure (13) mounted at a small distance from each other, and the heating means (10, 11) are provided in a space (E) between the basin (12) and the enclosure (13) and are divided between a lateral heating element (10) and a bottom heating element (11) so as to heat respectively the side wall (14) and the bottom (15) of said basin (12), the heating means (10, 11) being fed with electric current by means of complementary and detachable electrical connection devices (17, 18, 19) provided respectively on the enclosure (13) and the base (4).

2. Apparatus according to claim 1, wherein the lateral heating element (10) surrounds said basin (12) and extends substantially full height of said side wall (14).

3. Apparatus according to claim 1, wherein the bottom heating element 11) is constituted by an armored heating resistance, while the lateral heating element (10) is constituted by a resistive wire wound about an insulating support (20) encircling the basin (12), the relation of the power of the lateral heating element (10) to the maximum power of the bottom heating element (11) being between 0.3 and 0.4.

4. Apparatus according to claim 1, wherein the space (E) between the basin (12) and the enclosure (13) is sealed by sealing means (22, 23) disposed on the one hand between the upper edges (24, 25) of the basin (12) and the enclosure (13) and, on the other hand, between the respective walls of the bottoms (15, 26) of the basin (12) and the enclosure (13).

5. Apparatus according to claim 4, wherein the bottom (15) of the basin (12) comprises securement means (28) to the enclosure (13) so as to constitute, with the sealing means (22, 23) a completely sealed bowl (1), which exposes at the bottom (26) of the enclosure only said electrical connection devices (17, 18) and a temperature indicating stud (30) and the end of the drive shaft (7) provided with a removable coupling device (33) adapted to engage with a driver (34) secured to the output shaft (6) of said drive mechanism (5).

6. Apparatus according to claim 4, wherein the basin (12) and the enclosure (13) are cylindrical and the upper edge (24) of said basin (12) has a flange (27) in the form of a throat which encloses the edge (25) of the enclosure (13) and which contains one (22) of the sealing means.

7. Apparatus according to claim 1, wherein the basin (12) is of metal, the armored resistance (11) is secured to the bottom (15) of the basin (12), and the enclosure (13) is constituted by a thermally insulating plastic material and is separated from the armored resistance (11) by an insulating material (21).

8. Apparatus according to claim 1, wherein the working tool (8) comprises a scraper which has the form of a bar whose vertical cross section is triangular having a base (35) substantially parallel to the bottom (15) of the basin (12) and a leading surface (36) inclined upwardly.

9. Apparatus according to claim 1, wherein the bowl (1) is provided with a cover (37) of thermal insulating material comprising a metallic reflector (38) turned inwardly of the basin (12), and having an opening (39) for the escape of steam during cooking.

* * * * *